(12) United States Patent
Chueh et al.

(10) Patent No.: US 8,674,662 B2
(45) Date of Patent: Mar. 18, 2014

(54) USER SELECTABLE CHARGING MODES FOR DYNAMICALLY CHARGING BATTERIES FOR AN INFORMATION HANDLING SYSTEM

(75) Inventors: Yung Fa Chueh, Taipei (TW); Chia Fa Chang, Taipei (TW); Ching Ti, Taipei (TW); Kuang Chan Lee, Taipei (TW)

(73) Assignee: Dell Products L.P., Round Rock, TX (US)

( * ) Notice: Subject to any disclaimer, the term of this patent is extended or adjusted under 35 U.S.C. 154(b) by 246 days.

(21) Appl. No.: 12/032,688

(22) Filed: Feb. 17, 2008

(65) Prior Publication Data

US 2009/0206797 A1    Aug. 20, 2009

(51) Int. Cl.
*H02J 7/04* (2006.01)

(52) U.S. Cl.
USPC ............................ 320/150; 320/152; 320/153

(58) Field of Classification Search
USPC .................................. 320/150, 152, 153, 160
See application file for complete search history.

(56) References Cited

U.S. PATENT DOCUMENTS

| 5,166,596 | A | * | 11/1992 | Goedken | 320/150 |
| 5,254,931 | A | * | 10/1993 | Martensson | 320/114 |
| 5,325,040 | A | * | 6/1994 | Bogut et al. | 320/150 |
| 5,493,199 | A | * | 2/1996 | Koenck et al. | 320/106 |
| 5,677,944 | A | * | 10/1997 | Yamamoto et al. | 455/573 |
| 5,703,466 | A | | 12/1997 | Honda et al. | |
| 5,744,939 | A | | 4/1998 | Leppo | |
| 6,184,654 | B1 | * | 2/2001 | Bachner et al. | 320/114 |
| 6,433,515 | B2 | * | 8/2002 | Sakakibara | 320/137 |
| 6,911,804 | B2 | | 6/2005 | Mori | |
| 7,208,915 | B2 | | 4/2007 | Kubota et al. | |
| 2004/0148531 | A1 | * | 7/2004 | Yamazaki et al. | 713/300 |
| 2004/0222769 | A1 | | 11/2004 | Al-Anbuky et al. | |
| 2005/0275374 | A1 | | 12/2005 | Guang et al. | |
| 2006/0220620 | A1 | * | 10/2006 | Aradachi et al. | 320/150 |
| 2007/0188136 | A1 | | 8/2007 | Oh | |
| 2007/0212596 | A1 | | 9/2007 | Nebrigic et al. | |
| 2008/0048614 | A1 | * | 2/2008 | Partin et al. | 320/116 |

* cited by examiner

*Primary Examiner* — Yalkew Fantu
*Assistant Examiner* — Manuel Hernandez
(74) *Attorney, Agent, or Firm* — Baker Botts L.L.P.

(57) ABSTRACT

The disclosure provides a method for charging a battery in an information handling system. The method includes prompting a user to select from a plurality of charging modes for the battery, wherein the charging modes comprise a first mode, a second mode, or a third mode. The method further includes charging the battery in the first mode when the first mode is selected, wherein a charge voltage and a charge current are constant In the first mode, and charging the battery dynamically when the second mode or the third mode is selected, wherein the charge current changes dynamically based on a battery temperature.

17 Claims, 4 Drawing Sheets

---

Charging Mode Menu

1. Fast Charging Mode (fastest charging, lower battery performance)

2. Dump Charging Mode (faster charging, medium battery performance)

3. Battery Saving Mode (slow charging, best battery performance)

Enter Charging Mode  [        ]

USER SELECTABLE CHARGING MODES FOR DYNAMICALLY CHARGING BATTERIES FOR AN INFORMATION HANDLING SYSTEM

BACKGROUND

1. Technical Field

The present disclosure relates generally to the field of information handling systems (IHSs). More specifically, but without limitation., the present disclosure relates to charging rechargeable batteries in IHSs.

2. Background Information

As the value and use of information continues to increase, individuals and businesses seek additional ways to process and store information. One option available to users is an information handling system. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for such systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

In a portable information handling system (IHS), rechargeable batteries may be utilized to provide a mobile power source. Commonly used rechargeable batteries may include lead and/or sulfuric acid, nickel cadmium (NiCd), nickel metal hydride (NiMH), lithium ion (Li-ion), or lithium ion polymer (Li-ion polymer). Rechargeable batteries may be recharged by a charger to allow repeated use. For example, a dump charger or smart charger may be plugged into a power outlet to supply power to recharge batteries. A dump charger may be less costly than a smart charger, and as a result, many companies provide dump chargers to recharge batteries. A dump charger may set a charging current and voltage at one particular level, and modification of the charging current and voltage may be difficult. Further, a dump charger may not provide a user the ability to modify parameters in a charging cycle (i.e., charging current and voltage) based on a user's preferences. In order to change the charge current or voltage of a dump charger, the charger may need additional circuitry and/or software.

When rechargeable batteries are recharged, charging time and battery capacity may be of concern to a user. Thus, extending the battery life and shortening the charge time may both be beneficial to a user. However, there may be a negative correlation between battery life and charging time. In some cases, a faster charging time may reduce battery life, while a longer charging time may increase battery life. Manufacturers may only provide one charging method to users. However, the battery charge/discharge cycle and resulting battery life for the mode offered by the manufacturer may not be desired by the user.

Thus a need remains for methods and apparatus for providing multiple modes to suit different preferences for charging time and battery life, wherein a user may select among the multiple modes.

SUMMARY

The following presents a general summary of several aspects of the disclosure in order to provide a basic understanding of at least some aspects of the disclosure. This summary is not an extensive overview of the disclosure. It is not intended to identity key or critical elements of the disclosure or to delineate the scope of the claims. The following summary merely presents some concepts of the disclosure in a general form as a prelude to the more detailed description that follows.

One aspect of the disclosure provides a method for charging a battery in an information handling system. The method includes prompting a user to select from a plurality of charging modes for the battery, wherein the charging modes comprise a first mode, a second mode, or a third mode. The method further includes charging the battery in the first mode when the first mode is selected, wherein a charge voltage and a charge current are constant in the first mode, and charging the battery dynamically when the second mode or the third mode is selected wherein the charge current changes dynamically based on a battery temperature Another aspect of the disclosure provides an apparatus for charging a battery. The apparatus includes a charge controller for managing a charge voltage and a charge current when the battery is charged, wherein the charge controller provides a first mode with the charge voltage and the charge current remaining constant, a second mode for fast charging, wherein the charge current changes dynamically based on a battery temperature and a third mode for maximizing battery performance wherein the charge current changes dynamically based on the battery temperature. The apparatus also includes a battery management unit coupled to the battery and the charge controller, wherein the battery management unit monitors the battery temperature.

Yet another aspect of the disclosure provides an apparatus for charging a battery for a portable information handling system (IHS). The portable IHS includes a charge controller for managing a charge voltage and a charge current when the battery is charged, wherein the charge controller provides a first mode with the charge voltage and the charge current remaining constant, a second mode for fast charging, wherein the charge current changes dynamically based on a battery temperature, and a third mode for maximizing battery performance, wherein the charge current changes dynamically based on the battery temperature. The charge controller also includes a battery management unit coupled to the battery and the charge controller, wherein the battery management unit monitors the battery temperature, and an external power supply coupled to the charge controller, wherein the power supply provides power to recharge the battery.

BRIEF DESCRIPTION OF THE DRAWINGS

For detailed understanding of the present disclosure, references should be made to the following detailed description of the several aspects, taken in conjunction with the accompanying drawings, in which like elements have been given like numerals and wherein.

DETAILED DESCRIPTION

Figure 1:
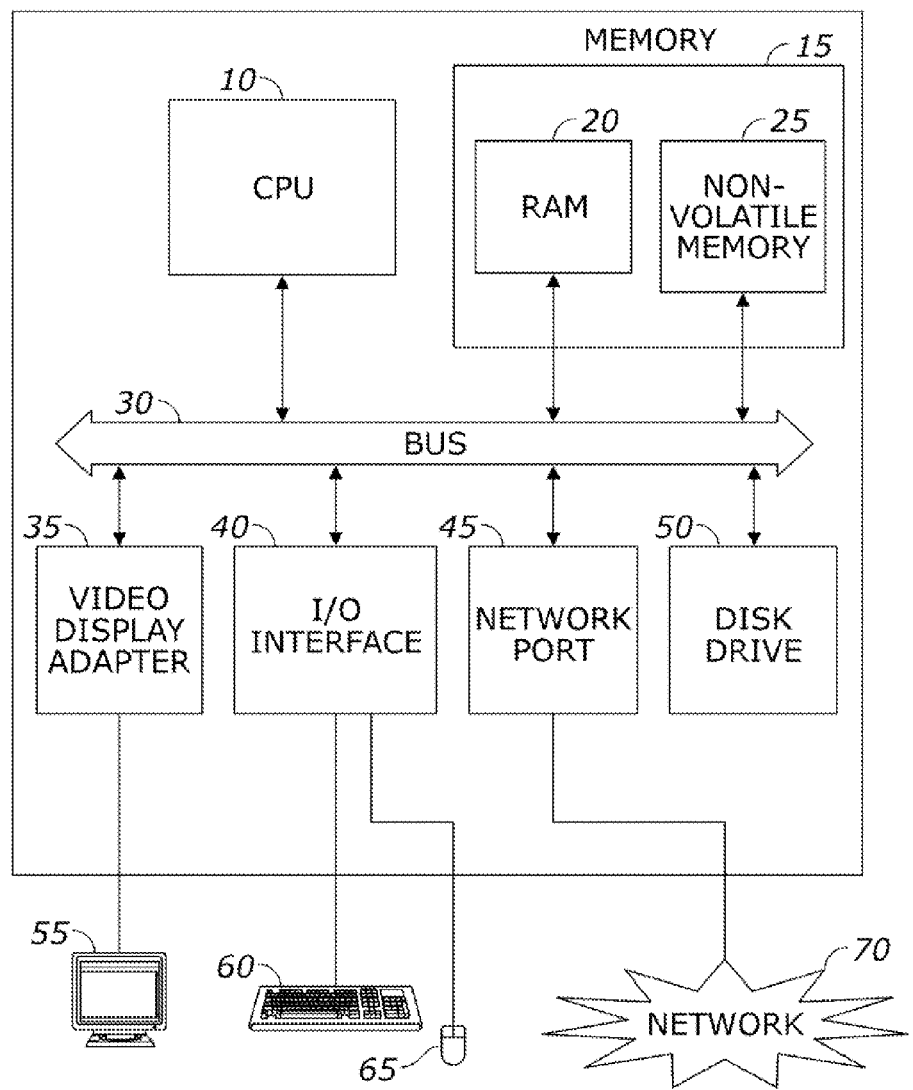
FIG. 1 represents an illustrative schematic of an information handling system (IRS) according to the present disclosure.

Although the invention as been described with reference to specific implementations, it will be understood by those skilled in the art that various changes may be made without departing from the spirit or scope of the invention. Various examples of such changes have been given in the forgoing description. Accordingly, the disclosure of implementations of the disclosure is intended to be illustrative of the scope of the invention and is not intended to be limiting. It is intended that the scope of the invention shall be limited only to the extent required by the appended claims. For example, to one of ordinary skill in the art, it will be readily apparent that the information handling system discussed herein may be implemented in a variety of implementations, and that the forgoing discussion of certain of these implementations does not necessarily represent a complete description of all possible implementations.

For simplicity and clarity of illustration, the drawing and/or figures illustrate the general manner of construction, and descriptions and details of well known features and techniques may be omitted to avoid unnecessarily obscuring the disclosure.

For purposes of this disclosure, an embodiment of an Information Handling System (IHS) may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an IHS may be a personal computer, a network storage device, or any other suitable device and may vary in size, shape, performance, functionality, and price. The IHS may include random access memory (RAM), one or more processing resources such as a central processing unit (CPU) or hardware or software control logic, ROM, and/or other types of nonvolatile memory. Additional components of the IHS may include one or more disk drives, one or more network ports for communicating with external devices as well as various input and output (I/O) devices, such as a keyboard, a mouse, and a video display. The IHS may also include one or more buses operable to transmit data communications between the various hardware components.

FIG. 1 illustrates one possible implementation of an IHS 5 comprising a CPU 10. It should be understood that the present disclosure has applicability to information handling systems as broadly described above, and is not intended to be limited to the IHS 5 as specifically described. The CPU 10 may comprise a processor a microprocessor, minicomputer, or any other suitable device, including combinations and/or a plurality thereof, for executing programmed instructions. The CPU 10 may be in data communication over a local interface bus 30 with components including memory 15 and input/output interfaces 40. The memory 15, as illustrated, may include non-volatile memory 25. The non-volatile memory 25 may include, but is not limited to, firmware flash memory and electrically erasable programmable read-only memory (EEPROM). The firmware program (not shown) may contain, programming and/or executable instructions required controlling a keyboard 60, mouse 65, video display 55 and/or other input/output devices not shown here. The memory may also comprise RAM 20. The operating system and application programs may be loaded into the RAM 20 for execution.

The IHS 5 may be implemented with a network port 45 to permit communication over a network 70 such as a local area network (LAN) or a wide area network (WAN), such as the Internet. As understood by those skilled in the art, IHS 5 implementations may also include an assortment of ports and interfaces for different peripherals and components, such as video display adapters 35, disk drives port 50, and input/output interfaces 40 (e.g., keyboard 60, mouse 65).

Figure 2:
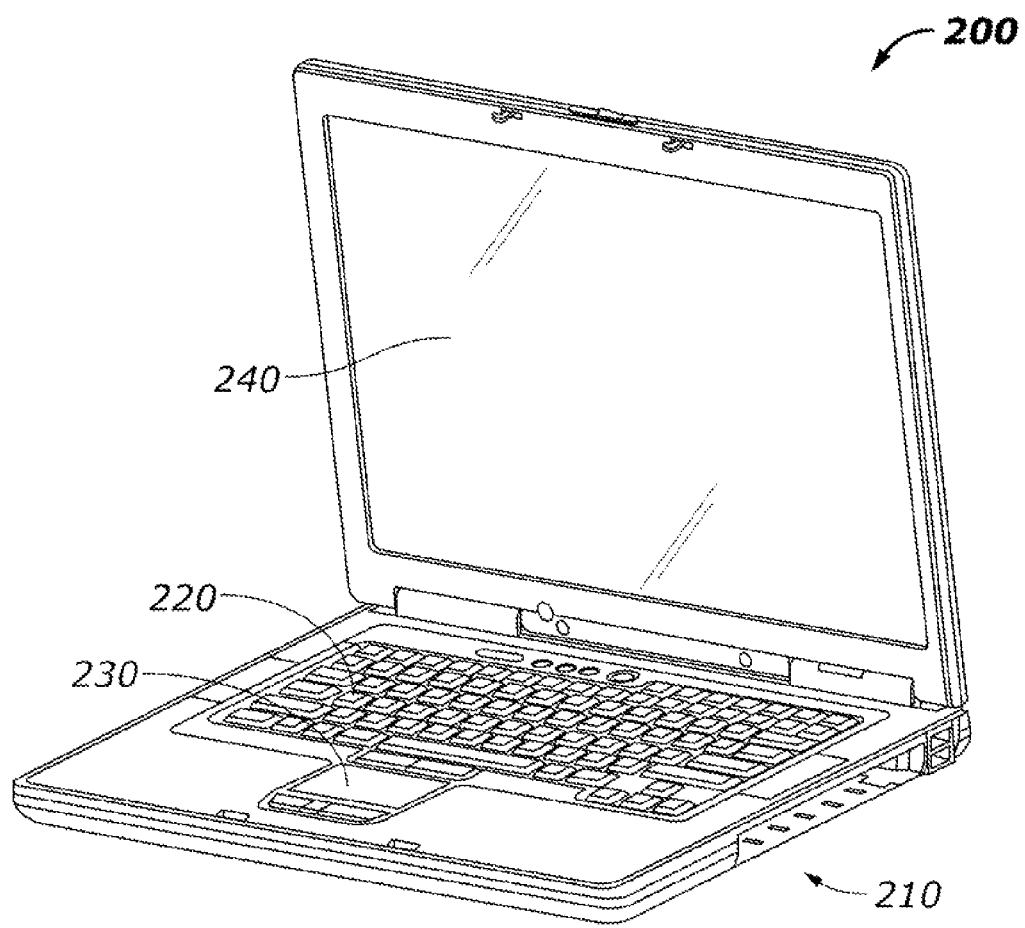
FIG. 2 represents an illustrative implementation of a portable IHS.

FIG. 2 provides an illustrative implementation of a portable IHS. A portable IHS may be a portable device such as a laptop, a handheld, a cell phone, a personal digital assistant (PDA), a portable audio player (e.g. MP3 player), or the like. As discussed previously, a portable IHS 200 may include a base 210 providing a plurality of 110 devices such as a keyboard 220, a touch pad 230, or the like. A portable IRS 200 may also include a display 230 to visually provide information to a user. A portable IHS 200 may operate utilizing a temporary power source such as one or more batteries.

Figure 3:
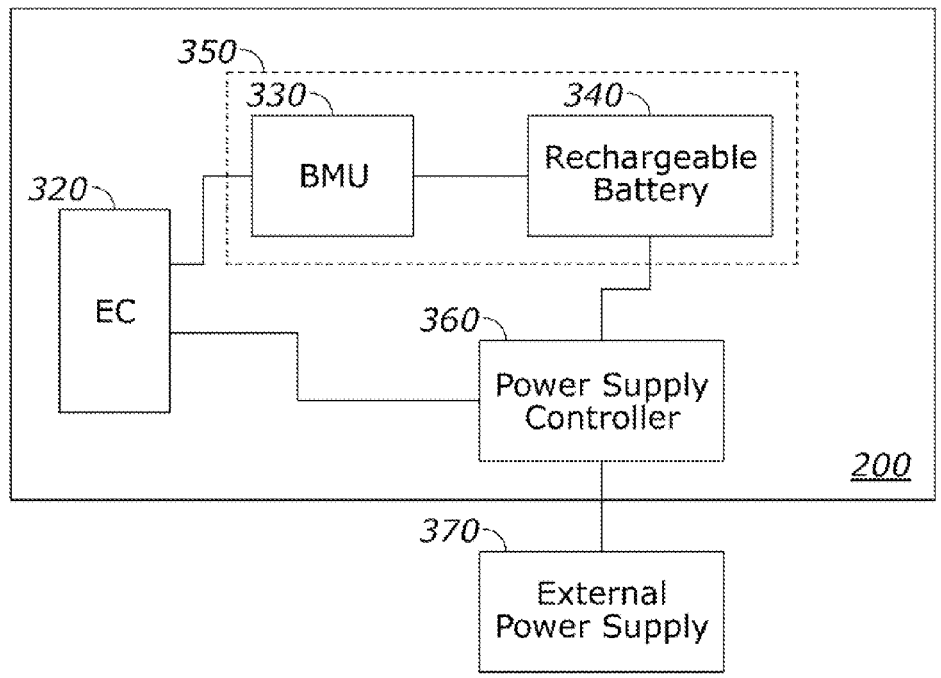
FIG. 3 represents an illustrative implementation of a battery charger in a portable IHS.

Rechargeable batteries may often be provided in a portable IHS as a renewable mobile power supply. FIG. 3 represents an illustrative implementation of a battery charger in a portable IHS. A portable IRS 200 may have an external power supply 370 utilized for charging batteries and powering the portable IRS 200. An external power source 370 may provide power from a power outlet (e.g., AC power outlet) or the like. A power supply controller 360 may operate to manage power provided to a portable IHS 200. For example, a portable IRS 200 may operate using power provided from an external power source 370 or a battery pack 350. As shown in FIG. 3, an external power supply 370 may be coupled to a portable IHS 200., however it is understood by one skilled in the art that an external power source 370 may not always be coupled to a portable IRS 200. When the portable IHS 200 is not coupled to an external power source 370, a power supply controller 360 may provide direct current (DC) power from a battery pack 350 to components of the portable IHS 200. When a portable IHS 200 is coupled to an external power supply 370, a power supply controller 360 may convert power from an external power supply 370 into DC power to be used by the portable IHS 200. At the same time, a power supply controller 360 may also provide power from an eternal power supply 370 to a battery pack 350 for recharging the battery pack 350. In one implementation of a power supply controller 360, an alternating current (AC) to DC converter may be present to convert AC power from and external power supply 370 into DC power. In another implementation, a DC to DC converter may be present in a power supply controller 360 to convert DC power from the battery pack 350 to DC power at another voltage level.

A power supply controller 360 may also include a charger such as a dump charger, a smart charger, an intelligent dump charger, or any other suitable type of charger. As used herein, a "dump charger" may be any type of charger that is set to one a specific charge voltage and current for charge a battery. A dump charger may require additional circuitry and/or software to allow the charge voltage and/or charge current to be altered. While a dump charger may cost less than a smart charger, it does not provide as much flexibility to change a charging method as a smart charger (described below).

As used herein, a "smart charger" may be any type of charger that may monitor a multitude of charging parameters. For example, a smart charger may monitor temperature, current, voltage, discharge rate, remaining capacity, as well as other conditions. Further, a smart charger may provide data regarding a battery type, model number, manufacturer, or the like. A smart charger may also allow charge current, charge voltage, an alarm warning, a charger mode, a charger status, charger specific information, and/or other charging parameters to be modified. By way of example and not limitation, a smart charger may provide system management bus (SMBus) data and clock lines to an embedded controller (EC) 320 allowing communication between the smart charger and the embedded controller. An EC may be a processor such as a central processing unit (CPU), a controller, or any other suitable device that may be utilized to communicate with a battery pack 350, such as a keyboard controller. While a smart charger may allow charging parameters to be modified, it may significantly increase the cost of a charging system for a portable IHS 200.

A power supply 360 may utilize an intelligent dump charger in place of a dump charger or smart charger. As used herein, an "intelligent dump charger" may refer to any type of charger classified in between a dump charger and a smart charger. An intelligent dump charger may monitor many charging conditions (e.g., temperature, voltage, current, etc.) similar to a smart charger, but it may only provide for limited modification of charging parameters, such as a charge current and/or charge voltage. Further, an intelligent dump charger may also have a SMBus allowing data regarding temperature, voltage, current, or the like to be provided to an EC 320. Based on the data received through a SMBus, an EC 320 may modify a charging current and charging voltage if desired. By utilizing an intelligent dump charger, some features of a smart charger may be realized while keeping the cost of a charging system for a portable IHS 200 near the cost of utilizing a dump charger. It should be noted that the present disclosure is in no way limited to implementations involving a dump charger, a smart charger, and an intelligent dump charger. Any suitable type of charger may be substituted in the illustrative implementations discussed herein.

When an external power supply 370 is not present, a portable IHS 200 may operate using DC power supplied from a battery pack 350. A battery pack 350 may include a battery management unit (BMU) 330 and a rechargeable battery 340. A BMU 330 may be a microprocessor incorporated in a battery pack 350 utilized when charging a rechargeable battery 340. A BMU 330 may also monitor charging conditions such as temperature, charge current, and charge voltage in a battery pack 350 and it may also be used to manage a charging cycle for a rechargeable battery 340. For example, a BMU 330 may provide an EC 320 with data regarding a rechargeable battery 340 temperature, current, voltage, and the like. An EC 320 may set or adjust a charging current or voltage based on the data provided by a BMU 330. A rechargeable battery 340 may contain one or more battery cells wherein each battery cell may release energy through an electrochemical reaction. The electrochemical reaction may be readily reversible after energy is released to allow energy to be restored in the battery cell. A rechargeable battery 340 may contain battery cells utilizing lead and/or sulfuric acid, nickel cadmium (NiCd), nickel metal hydride (NiMH), lithium ion (L-ion), lithium ion polymer (Li-ion polymer), or the like to store power.

Figure 4:
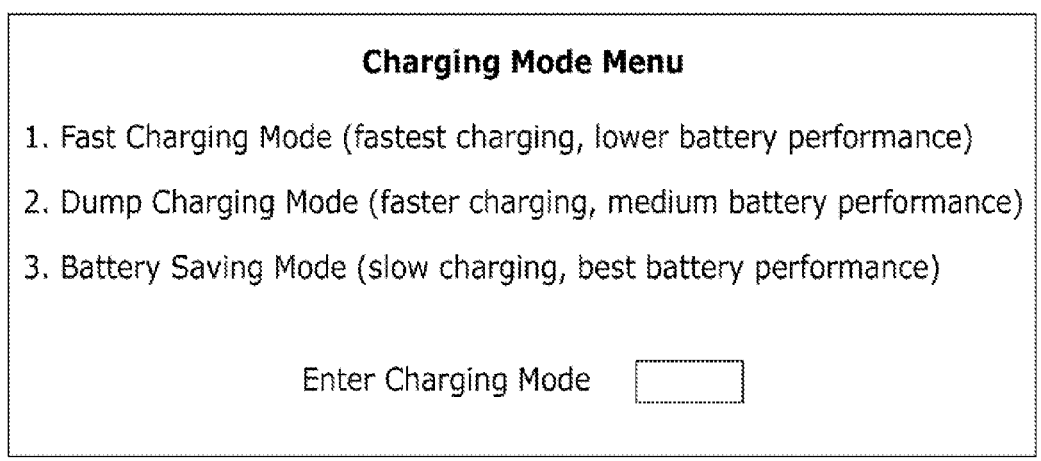
FIG. 4 represents an illustrative implementation of a charging mode menu.

FIG. 4 represents an illustrative implementation of a charging mode menu. As used herein, a "charging mode menu" may include any prompt which may allow a user to select between two or more charging modes. The present disclosure contemplates any charging mode menu with any varying format and additional information as what is shown in FIG. 4.

In the present implementation, three charging modes are provided to a user. However, the number of charging modes may be increased or decreased to accommodate different preferences of different users. A charging mode menu may be provided to a user in a power on self test (POST) menu, such as a basic input output system (BIOS) menu, or in an operating system (OS) menu, such as a utilities menu. By way of example and not limitation, an OS menu may be a Dell quickset utilities menu provided in Microsoft Windows XP, Microsoft Vista, or any suitable operating system.

A fast charging mode may provide the fastest charging method, but lower battery performance (i.e., battery life) than other charging modes. In other words, a fast charging mode may provide the shortest charging time, but a battery may not maintain as much charge capacity as in other charging modes after repeated recharging. A battery saving mode may provide slow charging, but the best battery performance for the charging modes. A dump charging mode may provide performance somewhere in between the battery saving mode and a fast charging mode. It may provide faster charging than a battery savings mode, but slower charging than a fast charging mode. A dump charging mode may also provide average battery performance or enhanced battery performance than a fast charging mode, but less battery performance than a battery saving mode. A user may select a charging mode to be utilized by entering a selected mode or the like. By allowing users to select a charging mode, a portable IHS can accommodate the varying preferences of several different users.

Figure 5:
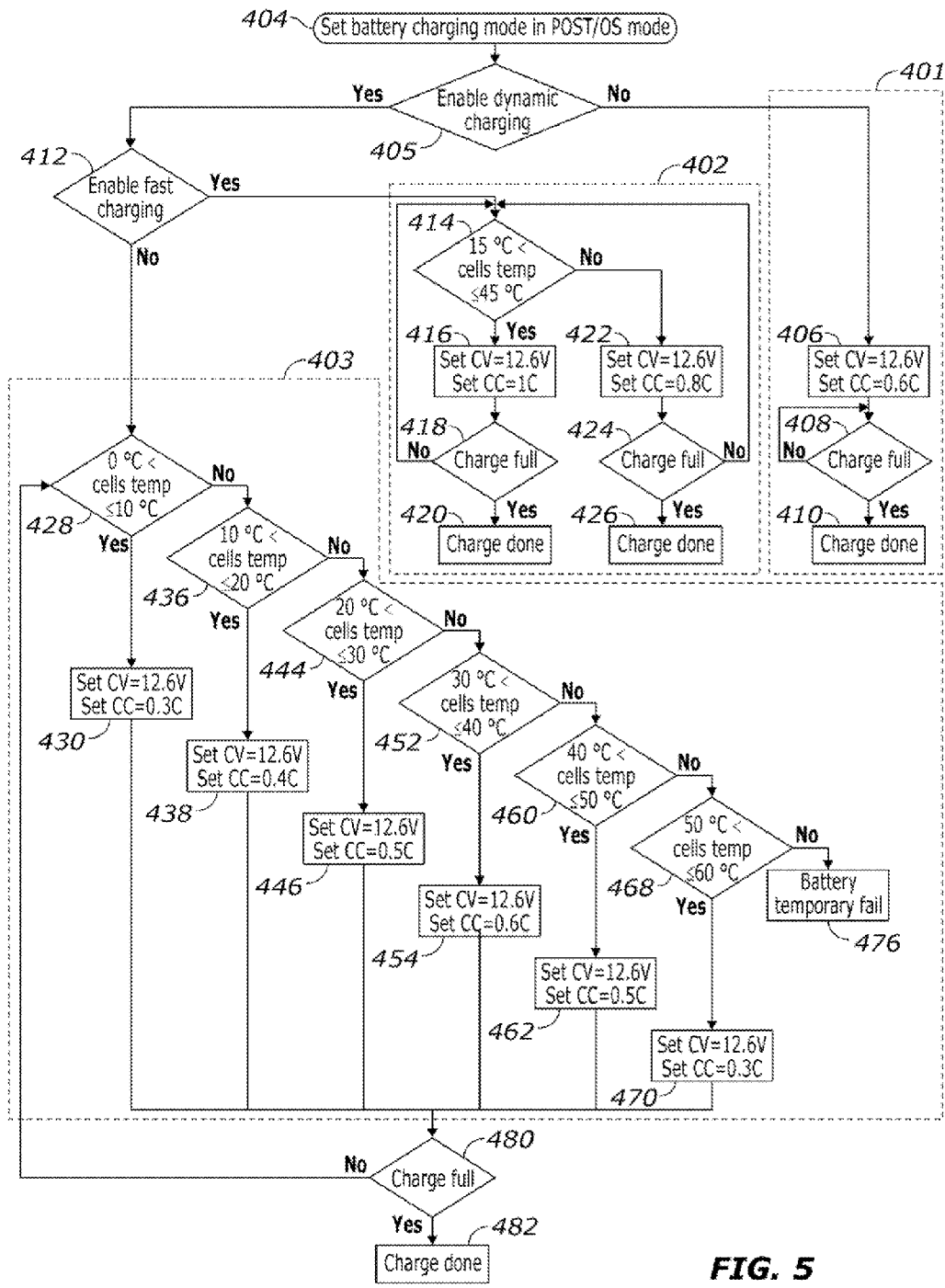
FIG. 5 represents a flow chart of an illustrative method for charging a battery in an IHS.

FIG. 5 provides a flow chart of an illustrative method for charging a battery in an IHS. A battery charging mode may be set in a POST or OS mode in step 404. A check may be performed to determine if a dynamic charging mode has been selected in step 405. In a dynamic charging mode, the charging voltage and/or the charging current may not be constant during charging. For example, the charging current may vary with parameters such as battery temperature or with time. If a dynamic charging mode has not been set, then a dump charging is performed in dump charging mode 401. A charger may be set in a dump charging mode 401 as a default setting. In a dump charging mode 401, a constant voltage of 12.6 volts (V) and a constant current of 0.6 coulombs (C) may be set as a charging voltage and current in step 406. In step 408, a BMU may be queried to determine if a battery has been fully charged. For example, a BMU may determine that a battery is fully charged when a charge current is less than a specified value and the maximum cell voltage is greater than a specified value for a continuous specified time. If the battery is not fully charged charging continues. However, if a battery is fully charged, the charger stops charging the battery in step 410.

A fast charging mode 402 and a battery saving mode 403 may both be dynamic charging methods. As a result, if a dynamic charging mode is detected in step 405, a check must also be performed to determine if a fast charging mode 402 has been enabled in step 412. If a fast charging mode 402 has been selected by a user, then a fast charging mode 402 may be performed. In a fast charging mode 402 the temperature of battery cells in a battery pack may be constantly monitored by a BMU. In step 414, a check is made to determine if the temperature of a battery cell ($T_b$) is a first temperature range or if $T_b$ is greater than 15 degrees Celsius (° C.) but less than or equal to 45° C. If the $T_b$ is in the range specified, then the battery is charged at a constant voltage of 12.6V and a first predetermined charging current of 1 C in step 416. In step 418, a BMU may check a battery to determine if it has been fully charged. If a battery has been completely charged, the charger is stopped in step 420. If a battery is not fully charged, then step 414 is repeated. If $T_b$ is not in the first temperature range, then the battery is charged at a constant voltage of 12.6V and a second predetermined charging current of 0.8 C. Next, a battery is checked to determine if it is fully charged in step 426, and charging is stopped if the battery is fully charged in step 426. If a battery is not fully charged, step 414 is performed again.

In a fast charging mode 402, a charger may modify a charging current based on a temperature of battery cells ($T_b$) value. When a $T_b$ is too high or too low, battery performance may be impaired. At a particular $T_b$, charging a battery above a particular charging current level may cause deterioration in battery performance. If a battery is charged at a lower charging current when $T_b$ is high, deterioration in battery performance may be reduced. However, charging a battery with a low current requires a longer charging time. For example, in a dump charging mode 401, a battery may be charged from 0% to 75% relative state of charge (RSOC) in 1.25 hours at 25° C. and a battery may be fully charged in 2.5 hours. In a fast charging mode 402, two charging current levels may be used. If the charging current is 1 C, then a battery may be charged from 0% to 75% in 0.75 hours. If the charging current is 0.8 C, then a battery may be charged from 0% to 75% in 0.93 hours. When a fast charging mode 402 is used, a battery capacity may be slightly greater than 80% after 340 charging cycles. If a dump charging mode 401 is used, battery capacity may be slightly better than with the fast charging mode 402. If a battery saving mode 403 is used, then battery capacity may be estimated to be as much as 5% greater after 340 charging cycles.

In step 412, if fast charging mode 402 has not been enabled, the charger operates in a battery saving mode 403. In a battery saving mode 403, a battery may be charged at a constant voltage of 12.6 V. However, a charging current may be changed based on a temperature of battery cells ($T_b$) in a battery. If $T_b$ is in a first temperature range or $T_b$ is greater than 0° C. but less than or equal to 10° C. in step 428, then a charge current is set to a third predetermined level such as 0.3 C in step 430. If $T_b$ is in a second temperature range or $T_b$ greater than 10° C. but less than or equal to 20° C. in step 436 then a charge current is set to a fourth predetermined level such as 0.4 C in step 438. If $T_b$ is in a third temperature range or $T_b$ greater than 20° C. but less than or equal to 30° C. in step 444 then a charge current is set to a fifth predetermined level such as 0.5 C in step 446. If $T_b$ is in a fourth temperature range or $T_b$ greater than 30° C. but less than or equal to 40° C. in step 452, then a charge current is set to a sixth predetermined level such as 0.6 C in step 454. If $T_b$ is in a fifth temperature range or $T_b$ greater than 40° C. but less than or equal to 50° C. in step 460, then a charge current is set back to the fifth predetermined level or 0.5 C in step 462. If $T_b$ is in a sixth temperature range or $T_b$ greater than 50° C. but less than or equal to 60° C. in step 468, then a charge current is set back to the third predetermined level or to 0.3 C in step 470. If $T_b$ is not within the temperature ranges specified (i.e., $T_b$ is less than 0° C. or greater than 60° C.), then battery charging temporarily fails and no charging is performed in step 476. After a charge current and charge voltage is set, it is determined if a battery has been charged to full capacity in step 480. If a battery has been fully charged, then charging is stopped in step 482. If a battery has not been fully charged, then $T_b$ is checked again in steps 428, 436, 444, 452, 460, and 468 so that a charge current and charge voltage at which the charger should be set can be determined. In a battery saving mode 403, the charge current may be significantly lower than in other modes. By keeping the charge current low, battery performance may be improved or a battery may not degrade as quickly as in the other charging modes. However, the lower charging current may require a longer charging time than the dump charging mode 401 and the fast charging mode 402.

As discussed previously, it is recognized that there are numerous types of rechargeable batteries may have different charging properties. The temperature ranges, charging voltage, and charging current provided in the implementations discussed are provided for illustration only. One of ordinary skill in the art recognizes that different temperature ranges, charging voltages, and charging currents may be desired for different types of batteries.

The present disclosure is to be taken as illustrative rather than as limiting the scope or nature of the claims below. Numerous modifications and variations will become apparent to those skilled in the art after studying the disclosure, including use of equivalent functional and/or structural substitutes for elements described herein, and/or use of equivalent functional junctions for couplings/links described herein.

What is claimed is:

1. A method for charging a battery in an information handling system the method comprising:
   coupling a charge controller and the battery to the information handling system (IHS), wherein the charge controller provides a plurality of charging modes comprising a first mode, a second mode, and a third mode;
   incorporating the plurality of charging modes into a charging mode menu, wherein the charging mode menu is provided by a power on self test (POST) menu or an operating system (OS) utility menu of the IHS;
   prompting a user to select a desired charging mode from the charging mode menu of the POST menu or the OS utility menu of the IHS;
   constant rate charging the battery in the first mode when the first mode is selected, wherein a charge voltage and a charge current are constant for fast battery charging regardless of battery performance and battery saving; and
   dynamically charging the battery when either the second mode or the third mode is selected, wherein the charge current changes dynamically based on battery temperature for improved battery performance and battery saving;
   wherein the first and second modes are fast charging modes relative to the third charging mode and the second mode is a faster charging mode relative to the first charging mode, and in which second mode the charge current is set at a first predetermined level if the battery temperature is in a first range and the charge current is set at a second predetermined level if the battery temperature is not in the first range.

2. The method of claim 1, wherein the charging mode menu is a menu of a plurality of charging modes incorporated into both the post menu and the OS utility menu.

3. The method of claim 1, wherein the first predetermined level is 1 C, the first range is greater than 15° C. and less than or equal to 45° C., and the second predetermined level is 0.8 C.

4. The method of claim 1, wherein the third mode is a battery saving mode in which the charge current increases up to a maximum of 0.6 C, and the charge current decreases when the battery temperature exceeds 40° C.

5. The method of claim 1, wherein the third mode is a battery saving mode in which the charge current is set at a third predetermined level when the battery temperature is in a second range, a fourth predetermined level when the battery temperature is in a third range, a fifth predetermined level when the battery temperature is in a fourth range, a sixth predetermined level when the battery temperature is in a fifth range, the fifth predetermined level when the battery temperature is in a sixth range, the third predetermined level when the battery temperature is in a seventh range, and the battery is not charged if the battery temperature is less than or equal to 0° C. or greater than 60° C.

6. The method of claim 5, wherein the third predetermined level is 0.3 C, the fourth predetermined level is 0.4 C, the fifth predetermined level is 0.5 C, the sixth predetermined level is 0.6 C, the second range is greater than 0° C. and less than or equal to 10° C., the third range is greater than 10° C. and less than or equal to 20° C., the fourth range is greater than 20° C. and less than or equal to 30° C., the fifth range is greater than 30° C. and less than or equal to 40° C., the sixth range is greater than 40° C. and less than or equal to 50° C., and the seventh range is greater than 50° C. and less than or equal to 60° C.

7. An apparatus for charging a battery, the apparatus comprising:
a charge controller for managing a charge voltage and a charge current when the battery is charged, wherein the charge controller provides a plurality of charging modes comprising:
a first mode with the charge voltage and the charge current remaining constant regardless of battery performance and battery saving;
a second mode for fast charging, wherein the charge current changes dynamically based on a battery temperature; and
a third mode for maximizing battery performance, wherein the charge current changes dynamically based on the battery temperature, wherein the plurality of charging modes is incorporated into a charging mode menu of a power on self test (POST) menu or an operating system (OS) utility menu of an information handling system (IHS) coupled to the charge controller; and
a battery management unit coupled to the battery and the charge controller, wherein the battery management unit monitors the battery temperature, wherein the first and second modes are fast charging modes relative to the third charging mode and the second mode is a faster charging mode relative to the first charging mode, and in which second mode the charge current is set at a first predetermined level if the battery temperature is in a first range and the charge current is set at a second predetermined level if the battery temperature is not in the first range.

8. The apparatus of claim 7 further comprising:
an external power supply coupled to the charge controller, wherein the power supply provides power to recharge the battery.

9. The apparatus of claim 7, wherein the charging mode menu is incorporated into both the POST menu and the OS utility menu.

10. The apparatus of claim 7, wherein the first predetermined level is 1 C, the first range is greater than 15° C. and less than or equal to 45° C., and the second predetermined level is 0.8 C.

11. The apparatus of claim 7, wherein the third mode is a battery saving mode in which the charge current increases up to a maximum of 0.6 C, and the charge current decreases when the battery temperature exceeds 40° C.

12. The apparatus of claim 7, wherein the third mode is a battery saving mode in which the charge current is set at a third predetermined level when the battery temperature is in a second range, a fourth predetermined level when the battery temperature is in a third range, a fifth predetermined level when the battery temperature is in a fourth range, a sixth predetermined level when the battery temperature is in a fifth range, the fifth predetermined level when the battery temperature is in a sixth range, the third predetermined level when the battery temperature is in a seventh range, and the battery is not charged if the battery temperature is less than or equal to 0° C. or greater than 60° C.

13. The method of claim 12, wherein the third predetermined level is 0.3 C, the fourth predetermined level is 0.4 C, the fifth predetermined level is 0.5 C, the sixth predetermined level is 0.6 C, the second range is greater than 0° C. and less than or equal to 10° C., the third range is greater than 10° C. and less than or equal to 20° C., the fourth range is greater than 20° C. and less than or equal to 30° C., the fifth range is greater than 30° C. and less than or equal to 40° C., the sixth range is greater than 40° C. and less than or equal to 50° C., and the seventh range is greater than 50° C. and less than or equal to 60° C.

14. An information handling system (IHS) comprising:
a charge controller for managing a charge voltage and a charge current when a battery coupled to the IHS is charged, the charge controller provides a plurality of charging modes comprising:
a first fast charging mode with the charge voltage and the charge current remaining constant regardless of battery performance and battery saving;
a second fast charging mode that is a faster charging mode relative to the first fast charging mode, wherein the charge current changes dynamically based on a battery temperature, wherein in the second mode the charge current is set at a first predetermined level if the battery temperature is in a first range and the charge current is set at a second predetermined level if the battery temperature is not in the first range; and
a third mode for maximizing battery saving that is a slower charging mode relative to the first and second fast charging modes, wherein the charge current changes dynamically based on the battery temperature, the plurality of charging modes incorporated into a charging mode menu of a power on self test (POST) menu or an operating system (OS) utility menu of the IHS coupled to the charge controller;
a battery management unit coupled to the battery and the charge controller, wherein the battery management unit monitors the battery temperature; and
an external power supply coupled to the charge controller, wherein the power supply provides power to recharge the battery.

15. The apparatus of claim 14, wherein the charging mode menu is incorporated into both the POST menu and the OS utility menu.

16. The apparatus of claim 14, wherein the first predetermined level is 1 C, the first range is greater than 15° C. and less than or equal to 45° C., and the second predetermined level is 0.8 C.

17. The apparatus of claim 14, wherein the third mode is a battery saving mode in which the charge current is set at a third predetermined level when the battery temperature is in a second range, a fourth predetermined level when the battery temperature is in a third range, a fifth predetermined level when the battery temperature is in a fourth range, a sixth predetermined level when the battery temperature is in a fifth range, the fifth predetermined level when the battery temperature is in a sixth range, the third predetermined level when the battery temperature is in a seventh range, and the battery is not charged if the battery temperature is less than or equal to 0° C. or greater than 60° C.

\* \* \* \* \*